US 7,801,067 B2

(12) United States Patent
Britton et al.

(10) Patent No.: US 7,801,067 B2
(45) Date of Patent: Sep. 21, 2010

(54) METHOD FOR MITIGATING COLLISIONS ON A DATA CHANNEL UPON REQUEST FROM A SUBSCRIBER

(75) Inventors: Michael J. Britton, Lake in the Hills, IL (US); Leslie G. Gustafson, Oakwood Hills, IL (US)

(73) Assignee: Motorola, Inc., Schaumburg, IL (US)

( * ) Notice: Subject to any disclaimer, the term of this patent is extended or adjusted under 35 U.S.C. 154(b) by 1848 days.

(21) Appl. No.: 10/634,561

(22) Filed: Aug. 5, 2003

(65) Prior Publication Data

US 2005/0030970 A1     Feb. 10, 2005

(51) Int. Cl.
*H04L 7/00*     (2006.01)
(52) U.S. Cl. .......................................... 370/312; 370/445
(58) Field of Classification Search ................... 307/445, 307/447, 448, 461, 462, 230, 235, 312, 299, 307/230.1, 231, 232, 233, 234, 237, 252, 307/253
See application file for complete search history.

(56) References Cited

U.S. PATENT DOCUMENTS 5,740,167 A * 4/1998 Taketsugu et al. ........... 370/337
6,011,960 A * 1/2000 Yamada et al. .................. 455/77
6,078,568 A * 6/2000 Wright et al. ................. 370/312
6,222,850 B1 * 4/2001 Johnson ....................... 370/445
6,434,132 B1 * 8/2002 Ishii et al. .................... 370/338
6,894,985 B2 * 5/2005 Billhartz ...................... 370/252
6,947,748 B2 * 9/2005 Li et al. ....................... 455/450
7,006,451 B2 * 2/2006 Kuwahara ................... 370/252
7,206,319 B2 * 4/2007 Li et al. ....................... 370/448
7,209,447 B1 * 4/2007 Marsh et al. ................. 370/237
7,403,496 B2 * 7/2008 Bonta .......................... 370/310
7,664,465 B2 * 2/2010 Shen et al. ................. 455/63.1
2001/0053139 A1 * 12/2001 Zimmermann et al. ...... 370/332
2003/0235178 A1 * 12/2003 Cai ............................. 370/342
2005/0007979 A1 * 1/2005 Tsien et al. .................. 370/329

* cited by examiner

*Primary Examiner*—Huy D Vu
*Assistant Examiner*—Dady Chery
(74) *Attorney, Agent, or Firm*—Barbara R. Doutre

(57) ABSTRACT

A subscriber (100) transmits data on a first data channel. While transmitting, the subscriber tracks the number of collisions it experiences on the first data channel (206). When the number of collisions reaches a threshold value, the subscriber transmits a reassignment request to move to a new data channel. Upon receipt of the reassignment request, a central processor (102) assumes that the first data channel is loaded. The central processor will then compare an incoming data rate to a value to determine if the first data channel is actually loaded, wherein the incoming data rate is measured by the central processor at the time the subscriber requested reassignment.

6 Claims, 5 Drawing Sheets

METHOD FOR MITIGATING COLLISIONS ON A DATA CHANNEL UPON REQUEST FROM A SUBSCRIBER

FIELD OF THE INVENTION

The present invention relates generally to a method for mitigating collisions on a data channel upon request from a subscriber.

BACKGROUND OF THE INVENTION

In a radio frequency ("RF") system, when a subscriber 100 enters a site, it sends affiliation data to a central processor 102 via a control channel as illustrated in FIG. 1. Once affiliated, the subscriber 100 may submit a data request 200 on the control channel 202 as illustrated in FIG. 2. If the central processor 102 finds that there is sufficient bandwidth available on the data channel at the site, the central processor 102 sends a grant 204 to the subscriber 100. The subscriber 100 then goes to the channel 206 indicated within the grant 204. Data service for the subscriber 100 begins on the data channel 206, and the subscriber 100 stays on the data channel 206 until data service has ended 208 (i.e., all data has been transmitted and/or received).

If, however, there is not sufficient bandwidth available on the data channel 206, the central processor 102 sends the subscriber 100 a busy signal 300 and places the subscriber 100 in a queue (not shown) as illustrated in FIG. 3. When bandwidth becomes available on the data channel 206, the central processor 102 sends the subscriber 100 a grant for data service 302; as in FIG. 2, once data service for the subscriber 100 begins on the data channel 206, the subscriber 100 stays on the data channel 206 until data service has ended 208. The busy signal scenario illustrated in FIG. 3 occurs in today's systems when a maximum number of subscribers have been assigned to all data channels. As such, collisions on the data channel may cause data service time for a subscriber to be long and the bandwidth per subscriber to be low as illustrated in FIG. 4; in other words, deterioration of useful bandwidth on RF data channels exists due to collisions between transmitting subscribers, and too many subscribers attempting to send data on a data channel increases the amount of time necessary for a subscriber to acquire bandwidth for its transmissions.

Thus, there exists a need for a subscriber to request reassignment to a new data channel when the subscriber is unable to acquire sufficient bandwidth on the data channel due to collisions with other transmitting subscribers on the same data channel.

BRIEF DESCRIPTION OF THE FIGURES

A preferred embodiment of the invention is now described, by way of example only, with reference to the accompanying figures in which.

DETAILED DESCRIPTION OF THE PREFERRED EMBODIMENT

Figure 1:
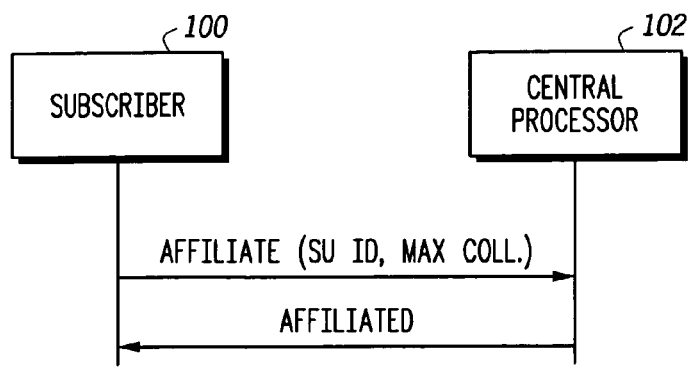
FIG. 1 (prior art) illustrates a message sequence flow diagram depicting site affiliation.
Figure 2:
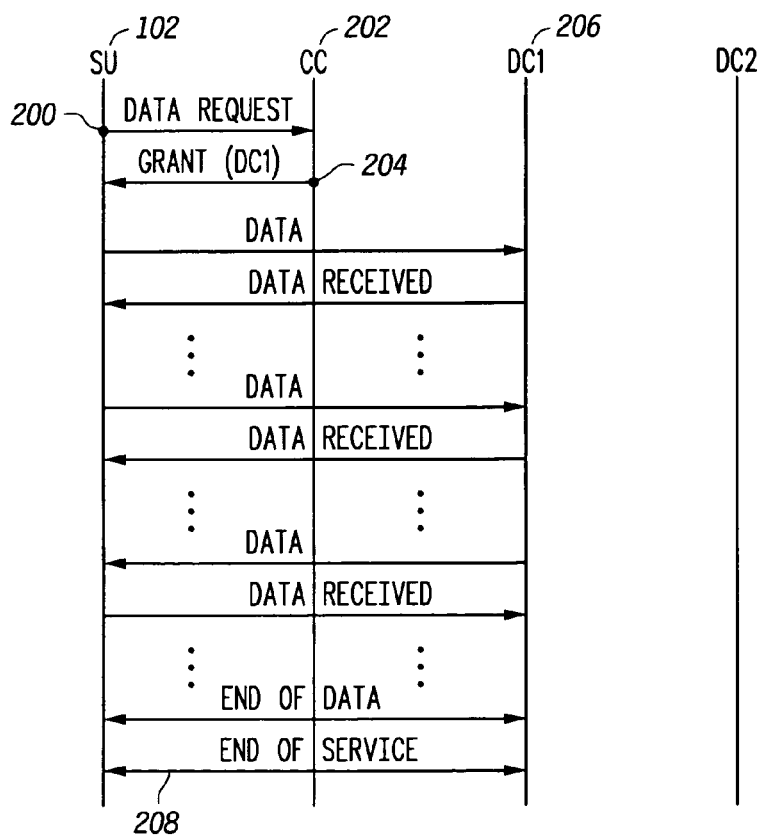
FIG. 2 (prior art) illustrates a message sequence flow diagram depicting data request and assignment.
Figure 4:
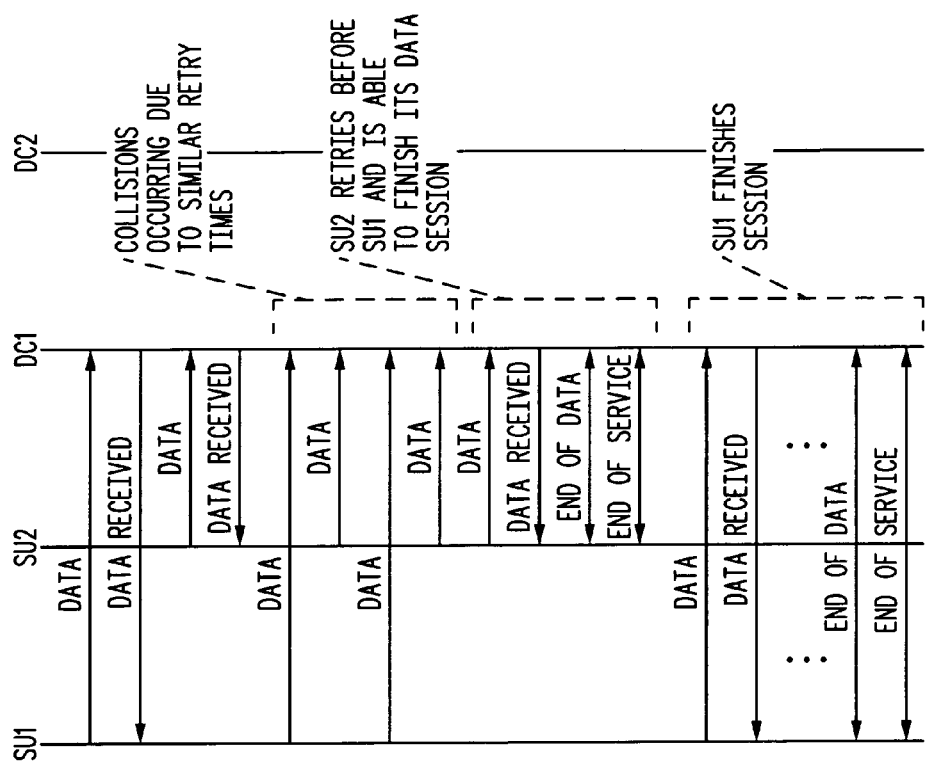
FIG. 4 (prior art) illustrates a message sequence flow diagram depicting collisions during data sessions.
Figure 3:
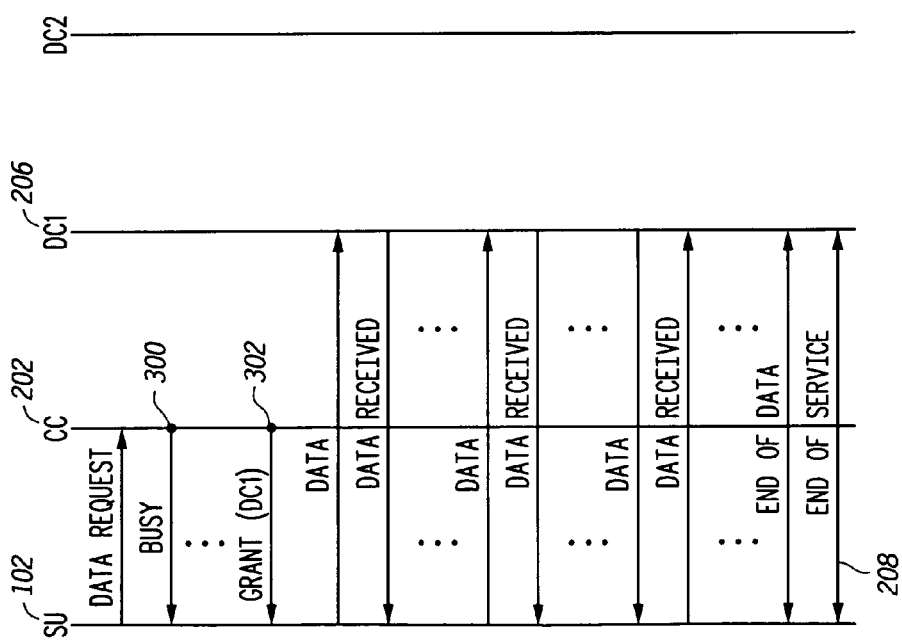
FIG. 3 (prior art) illustrates a message sequence flow diagram depicting busied data request and assignment.

It will be appreciated that for simplicity and clarity of illustration, elements shown in the figures have not necessarily been drawn to scale. For example, the dimensions of some of the elements are exaggerated relative to each other. Further, where considered appropriate, reference numerals have been repeated among the figures to indicate identical elements.

The present invention allows for a subscriber 100 to request reassignment to a new RF data channel when the subscriber 100 is unable to acquire sufficient bandwidth on its currently assigned RF data channel due to collisions with other transmitting subscribers on the same RF data channel. When the subscriber 100 realizes that it has had a given number of collisions with other transmitting subscribers, it will return to the control channel where it will send a reassignment request to the central processor 102 to switch data channels. If the subscriber 100 is able to move off the original data channel, it will mitigate, and in some cases prevent, collisions that would have been caused by the subscriber 100 continuing its requests on the original data channel. Further, the subscriber 100 is able to receive the bandwidth it requires sooner on the new data channel. Let us look at the present invention in further detail by referring to FIGS. 5-8.

Figure 5:
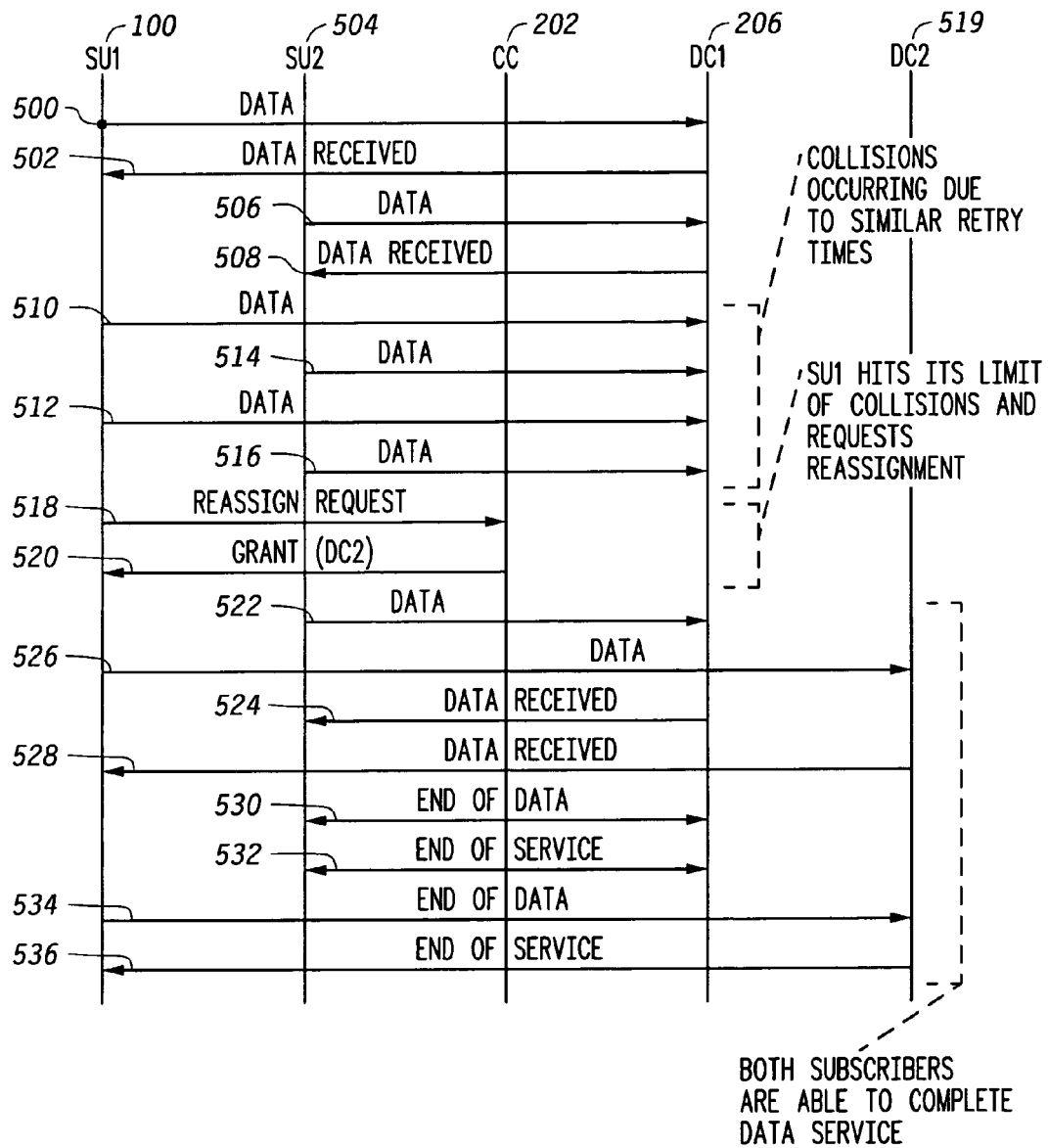
FIG. 5 illustrates an example message sequence flow diagram depicting a subscriber requesting reassignment in accordance with the present invention.

As stated above, the present invention allows a subscriber to leave an overloaded (i.e., fully utilized) data channel and request reassignment to a new data channel. As illustrated in FIG. 5, a first subscriber 100 is transmitting and receiving data 500, 502 on a first data channel 206. A second subscriber 504 is also transmitting and receiving data 506, 508 on the first data channel 206. After a while, transmissions 510, 512 from the first subscriber 100 begin to collide with transmissions 514, 516 from the second subscriber 504. In this example, the first subscriber 100 has a lower threshold for collisions than the second subscriber 504. The collision threshold can either be preprogrammed (i.e., known a priori by the subscriber), or the collision threshold can be user configurable. As such, when the first subscriber 100 reaches its threshold for collisions, it sends a reassignment request 518 on the control channel 202 to request reassignment to a new data channel.

Upon reassignment request to the new data channel, the central processor 102 reassigns the first subscriber 100 to a second data channel 519, via a grant message 520, which is not already being fully utilized as illustrated in FIG. 5. The second subscriber 504 continues to transmit and receive data 522, 524 on the first data channel 206, and now, the first subscriber 100 begins to transmit and receive data 526, 528 on the second data channel 519. As such, each subscriber 100, 504 is able to acquire the amount of bandwidth it requires, and thus is able to complete its data service 530, 532, 534, 536.

Figure 6:
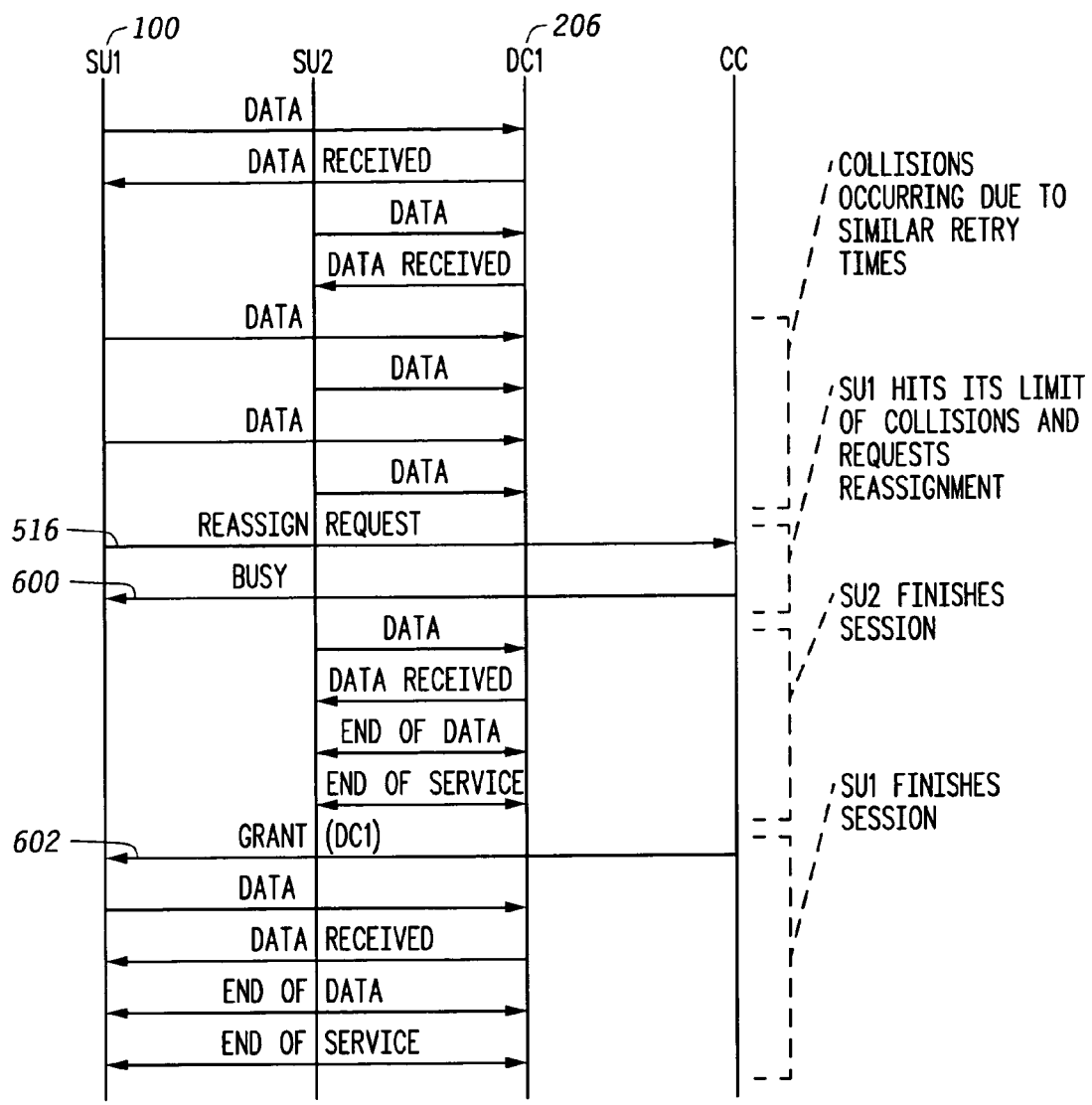
FIG. 6 illustrates an example message sequence flow diagram depicting sending a busy signal to a subscriber requesting reassignment in accordance with the present invention.

If, however, upon reassignment request 516 to the new data channel, the central processor 102 determines that all other data channels were already fully loaded, the subscriber 100 requesting reassignment is issued a busy signal 600 until the central processor 102 determines that the new data channel is no longer fully loaded, after which, the central processor 102 assigns 602 the subscriber 100 to the new data channel. It should be noted that the central processor 102 may reassign the subscriber 100 back to its original data channel as illustrated in FIG. 6, however, the central processor 102 may assign the subscriber 100 to any data channel that is not being fully utilized; typically, the subscriber 100 is reassigned back to its original data channel when a second subscriber that was previously transmitting and/or receiving data on the original data channel recently completed its data service and new bandwidth is now available on the original data channel, or when the original data channel is the least utilized data channel at the site, or the like.

For each reassignment request, the central processor 102 at the site compares the incoming data rate (i.e., the rate at which data is being received from the subscribers on that data channel) to a value. The value may be predefined or the value may be an average of previously received incoming data rates at which other subscribers have requested reassignment; for purposes of the following discussion of the present invention, this value is an average of previously received incoming data rates at which other subscribers have requested reassignment and will be referred to hereafter as a high watermark. It is important to note, however, that the watermark may alternatively be implemented as a predetermined value. If the incoming data rate (i.e., as seen by the central processor 102) at the time the subscriber 100 requests reassignment is significantly lower than the high watermark, the central processor 102 does not mark the channel as loaded and disregards the incoming data rate at the time of the request from the subscriber 100 when calculating subsequent high watermarks. The central processor 102 disregards this incoming data rate to prevent corruption of subsequent high watermarks due to circumstances unrelated to the available bandwidth on the data channel, such as signal degradation experienced only by the subscriber 100. Even if the central processor 102 disregards the incoming data rate from the subscriber 100, the central processor 102 reassigns the subscriber 100 to the data channel having the lowest current incoming data rate (even if that is the data channel to which the subscriber 100 was previously assigned).

If the incoming data rate at the time the subscriber requested reassignment is similar or higher than the high watermark, the central processor 102 marks the current data channel as loaded and uses the current incoming data rate to recalculate a new high watermark with which to compare subsequent incoming data rates when the reassignment request is received. The central processor 102 also reassigns the subscriber 100 to a data channel that has not been flagged as loaded. In the case of all the data channels being marked as full, the central processor 102 sends a busy signal to the subscriber 100.

When a call ends on a channel that is marked as loaded, the central processor 102 re-evaluates whether the channel is still loaded by comparing current incoming data rates to the high watermark; this comparison prevents assigning new subscribers to the channel if subscribers currently assigned to the channel have already consumed all of the newly available bandwidth. If the incoming data rate is lower than the high watermark, the central processor 102 considers the channel as no longer fully loaded. Thus, if a subscriber has completed its data call and had been utilizing incoming bandwidth, the central processor 102 recognizes this and assigns a new subscriber to the data channel in order to utilize the newly available incoming bandwidth. Additionally, the central processor 102 also continually monitors incoming data rates on all channels flagged as loaded. If the incoming data rate falls significantly lower than the high watermark, the central processor 102 considers the channel as no longer fully loaded. Thus, if a subscriber assigned to the data channel has been transmitting a lot of data and has recently stopped transmitting data and is only receiving data, the central processor 102 allows assignment of another subscriber to the data channel in order to utilize the incoming bandwidth previously being utilized.

The central processor 102 logs the incoming data rate each time a reassignment is requested. Additionally, the central processor 102 logs a maximum collision count sent by the subscriber 100 along with the subscriber's identifier and the number of data packets the system received from the subscriber 100 during the data session (this can be used to calculate the number of collisions that occurred on the last attempt to send data and the number of collisions that occurred during the entire call). System technicians and design engineers may use the logged information to tailor each subscriber's configured maximum number of retries. Also, the initial value of the calculated average loaded data rate and a value representing a percentage of the calculated average loaded data rate that is significant in a particular system can be tailored.

Since each subscriber affiliates with its own maximum collision count data, system technicians and design engineers can tailor each subscriber's maximum collision count such that channel reassignment can be prioritized. In this manner, subscribers of large groups and/or higher priority subscribers can utilize lower or higher numbers of collisions before requesting reassignment. Higher priority subscribers on a system with few data channels would utilize a higher collision count in order to gain access on data channels in times of high collisions. In systems with many data channels, however, the higher priority subscribers may utilize a lower collision count (i.e., lower threshold for collisions) in order to access data channels that have lower current utilization and/or where access times are shorter.

To prioritize reassignment to the subscribers assigned to a data channel for the least amount of time, thus allowing subscribers that were assigned to the data channel for a greater amount of time to remain on the channel, subscribers calculate a maximum collision rate by taking an average of collisions per packet for the duration of the entire data session. This average, however, will only be calculated after a data session is established such that a subscriber that has never received any data or acknowledgement from a data channel will not request reassignment. This will prevent subscribers in an area of poor coverage from filling the control channel with reassignment requests. Additionally, the average collisions per packet for a data session calculation include the data packet currently being transmitted. Thus, if the maximum collisions per packet were configured to be three and the session establishment packet had two collisions, the subscriber requests reassignment at the fourth collision it tracked if it was currently transmitting the second packet. Finally, if the number of collisions experienced by the subscriber while transmitting the session establishment packet is higher than the maximum collision configuration for the subscriber, the subscriber uses the maximum collision setting for the establishment packet when calculating the average number of collisions per packet per session. Thus, with the settings from the previous example, if the subscriber experienced four collisions while sending the session establishment packet, the subscriber requests reassignment after experiencing the third collision when transmitting the second packet.

Figure 7:
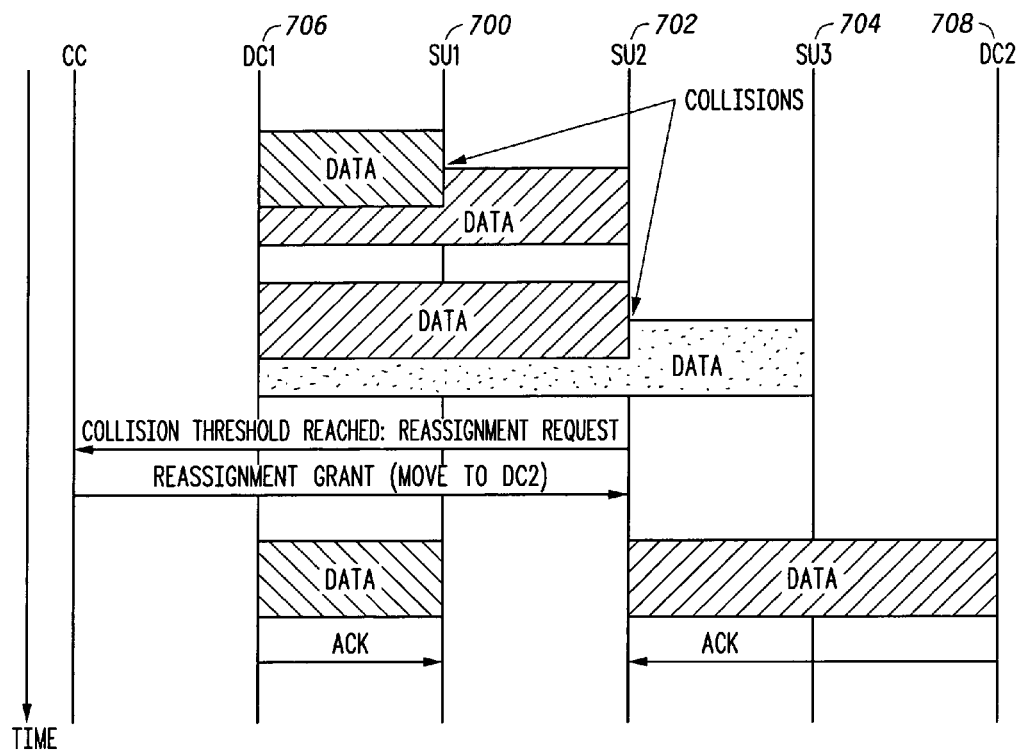
FIG. 7 illustrates an example of transmissions over a period of time where multiple subscribers collide in accordance with the present invention.
Figure 8:
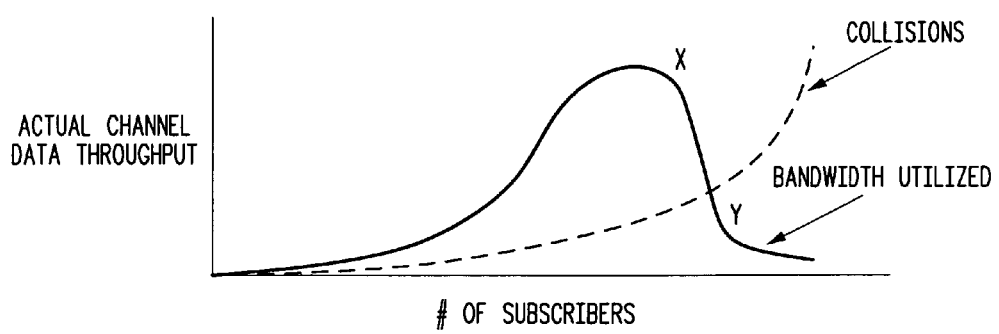
FIG. 8 illustrates a chart plotting how data collisions impact the actual channel data throughput rate in accordance with the present invention.

Let us now refer to FIGS. 7 and 8 to illustrate an example of the present invention. As illustrated, a first subscriber 700, a second subscriber 702, and a third subscriber 704, are attempting to transmit on a common data channel 706. The second subscriber 702 is configured such that the maximum number of collisions allowed before it requests reassignment to another data channel is two. The first subscriber 700 begins transmitting on the first data channel 706. Shortly thereafter, the second subscriber 702 begins transmitting on the first data channel 706 and a collision occurs between a packet transmitted from the first subscriber 700 and a packet transmitted from the second subscriber 702. As a result, both packets of information are corrupted and must be retransmitted. After the second subscriber 702 realizes a collision has occurred (since there was no acknowledgement message received from first data channel 706), the second subscriber 702 begins to retransmit the data. This time, the third subscriber 704 also attempts to transmit data and another collision occurs, this time between a packet transmitted from the second subscriber 702 and a packet transmitted from the third subscriber 704. Again, the second subscriber 702 realizes a collision has occurred, but since two is the maximum number of collisions allowed before requesting reassignment, it sends a message on the control channel requesting reassignment to a different channel. The second subscriber 702 receives a grant message on the control channel instructing it to attempt transmissions on a second data channel 708. When the second subscriber 702 tries transmitting its data on the second data channel 708, it is able to acquire sufficient bandwidth to complete its data service, and the first subscriber 700 and the third subscriber 704 are able to acquire sufficient bandwidth to complete their data services on the first data channel 706.

Thus, as the number of subscribers on a data channel increases, so does bandwidth utilization and collisions. As illustrated in FIG. 8, at point X, the number of collisions occurring causes a significant decrease in bandwidth utilization. From this point on, as more subscribers attempt to access the data channel, we continue along the curve toward point Y. By utilizing the present invention to move subscribers onto other channels early on, we can move back up the curve toward point X to better utilize the available bandwidth on a given data channel.

The term "significant" is used throughout this specification with respect to determining levels of comparison. This term is used because the levels of comparison to a value may be different depending on the system and use of the present invention. The major impacts to the level of significance are the size of increments at which the system can determine bandwidth, the way in which bandwidth is determined, the number of subscribers in a system, and what failures can occur and their effect on bandwidth in a particular system. For example, in a system with a 25 Kbaud total bandwidth calculated once per second, a catastrophic loss of signal may cause non-utilization of the full bandwidth for one tenth of a second (0.1 second). Thus, a drop of more than 2.5 (25*0.1) Kbaud in bandwidth over a one second period would be the level of significance. This means that bandwidth utilization of less than 21 Kbaud would be significantly lower than 25 Kbaud whereas a bandwidth utilization of 23 KHz would be significantly similar to 25 baud. A similar system with full 250 Kbaud of total bandwidth calculated once per second, a catastrophic loss of signal to one subscriber may cause non-utilization of half (0.5) of the bandwidth for one one hundredth of a second (0.01 second). Thus, a drop of more than 12.5 baud (250*0.5*0.01) in bandwidth utilization over a one second period would be the level of significance. This means that in the second system, bandwidth utilization of less than 230 Kbaud would be significantly lower than 250 Kbaud whereas a bandwidth utilization of 240 Kbaud would be significantly similar to 250 Kbaud. The amount of bandwidth lost over a period of time is affected due to the number of subscribers on a system such that in a system with many subscribers, there is likely to be more bandwidth lost due to collisions than in a system with few subscribers. However, a system with fewer subscribers is likely to see a greater loss in bandwidth utilization due to a single lost subscriber than a larger system.

While the invention has been described in conjunction with specific embodiments thereof, additional advantages and modifications will readily occur to those skilled in the art. The invention, in its broader aspects, is therefore not limited to the specific details, representative apparatus, and illustrative examples shown and described. Various alterations, modifications and variations will be apparent to those skilled in the art in light of the foregoing description. Thus, it should be understood that the invention is not limited by the foregoing description, but embraces all such alterations, modifications and variations in accordance with the spirit and scope of the appended claims.

We claim:

1. A method comprising the steps of:
   at a subscriber:
   transmitting data on a data channel;
   during the step of transmitting, tracking a number of collisions on the data channel until the number of collisions reaches a threshold value indicating that the subscriber is unable to acquire sufficient bandwidth on the data channel due to collisions with other transmitting subscribers on the data channel; and
   when the number of collisions reaches the threshold value thereby indicating that the data channel is fully utilized, transmitting a reassignment request to move to a new data channel.

2. The method of claim 1 wherein the reassignment request is transmitted to a central processor.

3. The method of claim 1 wherein the reassignment request is transmitted on a control channel.

4. The method of claim 1 and further comprising the step of transmitting any remaining data on the new data channel upon receipt of a reassignment grant.

5. The method of claim 1 wherein the threshold value is known a priori.

6. The method of claim 1 wherein the threshold value is user configurable.

* * * * *